May 5, 1936. H. BAEHR 2,039,277

DOUGH MACHINE ATTACHMENT

Filed Feb. 25, 1935 2 Sheets—Sheet 1

Inventor

Henry Baehr

By Clarence A. O'Brien
Attorney

May 5, 1936. H. BAEHR 2,039,277
DOUGH MACHINE ATTACHMENT
Filed Feb. 25, 1935   2 Sheets-Sheet 2
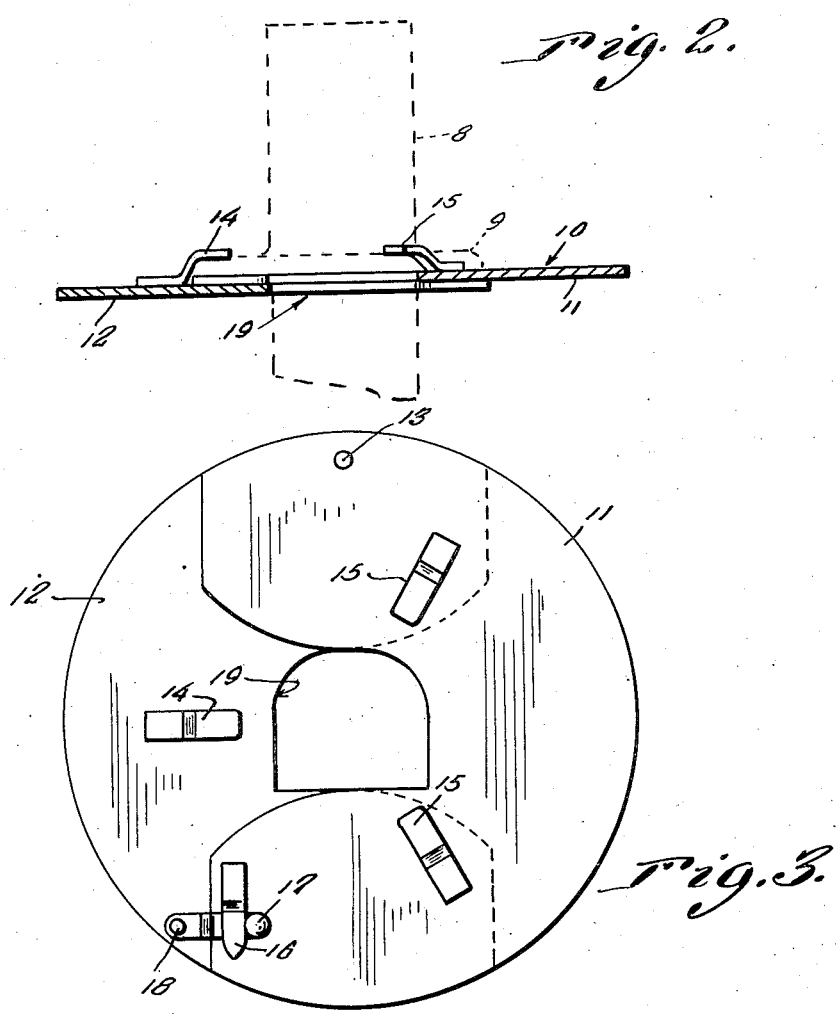
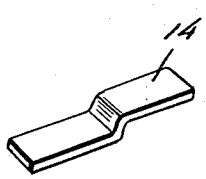
Inventor
Henry Baehr
By Clarence A. O'Brien
Attorney Patented May 5, 1936

2,039,277

UNITED STATES PATENT OFFICE 2,039,277

DOUGH MACHINE ATTACHMENT

Henry Baehr, Wisner, Nebr.

Application February 25, 1935, Serial No. 8,196

3 Claims. (Cl. 259—1)

This invention relates to a device which is adapted for use in connection with machinery such as is employed in present day modern bakeries and it has more specific reference to a detachable guard designed to serve as a guard or shield to prevent the dough, while being mixed in the dough receptacle, from creeping up the dough hook.

Novelty is thought to reside in the provision of a sectional disk-like guard which is attachable to the dough hook to function as a simple and efficient shield, the idea being to promote sanitation and efficiency by preventing the dough from creeping up the shaft during the rotary movement of the dasher in the dough mixing receptacle.

The explicit details utilized in constructing the preferred embodiment of the invention will become more readily apparent from the following description and drawings.

In the accompanying illustrative pictorial drawings, wherein like numerals are employed to designate like parts throughout the views:—

Figure 2 is a sectional view through the attachment per se showing parts of the old structure in dotted lines.

Figure 3 is a top plan view of the complete attachment removed from the mixing device or dasher.

Figure 5 is a perspective of one of the details or retaining cleats.

Figure 1:
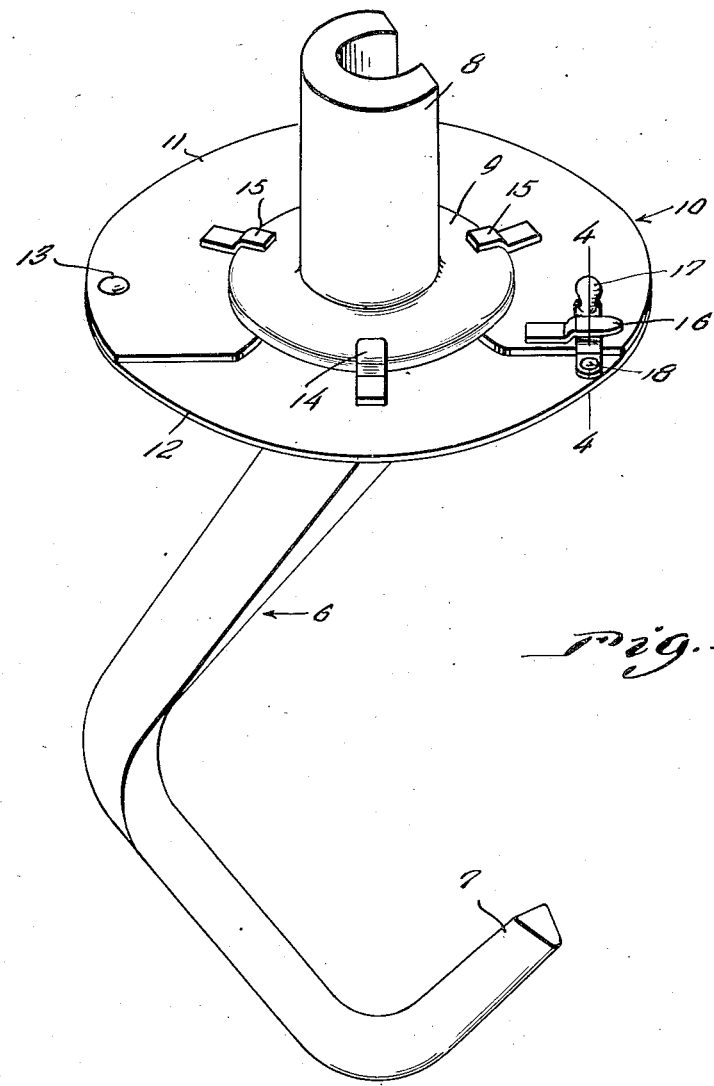
Figure 1 is a perspective view of a rotary dasher or agitator used in connection with a conventional dough mixing machine showing the manner in which the shield or guard is associated therewith.
Figure 4:
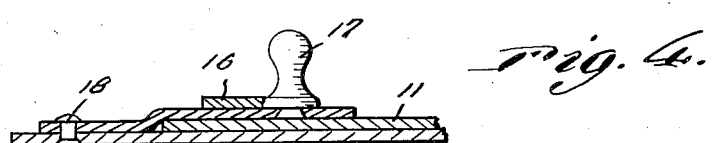
Figure 4 is an exaggerated detail sectional view of a fragmentary type, the section being on the plane of the line 4—4 of Figure 1.

By way of introduction it is to be pointed out that I have discerned that in dough machines such as are used in bakeries for mixing cake dough and the like, the receptacle or container in which the dough is mixed is generally open at the top. In this particular type of mixing machines to which I refer a rotary dasher or mixing device is employed and this is illustrated in the drawings in Figure 1 and denoted by the numeral 6. It is of a well known type and includes an agitating shank having a terminal return bent hook 7 and carried on the lower end of the rotating shaft 8. The shaft is provided with an outstanding circular flange or collar 9. These are all conventional features and the improved guard or shield, denoted as a unit by the numeral 10, is constructed for cooperation with these parts without requiring alterations, thus making it in the form of a readily usable attachment.

In carrying the invention into practice, I have found it expedient and practicable to use a disk-like plate or flange composed of a pair of duplicate companion sections 11 and 12 hingedly connected together as at 13. These sections are substantially U-shaped in plan view so that when positioned in overlapping relation and swung together as shown in Figure 3, they cooperate in defining an opening or aperture 19 which snugly surrounds the shaft portion of the dasher. On the central portion of the section 12, that is between the ends thereof is a permanently attached retaining clip 14 which is of hooked form to engage over the marginal edge of the flange 9. A pair of complemental clips 15 located at circumferentially spaced, equi-distant points on the arm portions of the section 12 cooperate with the clip 14 in providing the requisite balance and uniformity in action.

I next call attention to a keeper of a suitable type 16 rigidly secured to the free end portion of one of the arms of the section 11 as shown in Figure 3. This is arranged to accommodate the knob equipped end portion of a fastening latch 17 pivotally mounted as at 18 on the adjacent part of the companion section 12. This simplified use of a pair of duplicate companion sections 11 and 12 arranged in superposed or overlapping relationship provides a disk-like cover which when attached to the flange 9 serves as a guard or a shield to prevent the dough in the receptacle (not shown) from riding up and out of said receptacle. The result is that its use promotes requisite efficiency and sanitation in and around the dough mixing machine.

The novelty obviously resides in the provision of a pair of U-shaped parts or units 11 and 12 of duplicate types hinged together as at 13 to swing into overlapping relation and shaped to define a sectional disk, these being provided with equi-distant hook shaped retaining clips 14 and 15 to engage over the edge portion of the flange 9. Then too, additional novelty resides in the provision of a simple, easily accessible and operable pivoted latch 17 engageable with the keeper 16 wherein all of said parts have been carefully selected and coordinated to provide for the desired usefulness.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

1. An attachment of the class described comprising a sectional guard forming disk embodying duplicate pivotally connected sections, a keeper carried by the free end portion of one section, a pivoted retaining latch carried by the corresponding end portion of the remaining section and engageable with said keeper, and a plurality of circumferentially spaced equi-distant clips carried by the central portion of said disk and adapted for engagement with the supporting flange on a mixing device of the type described.

2. As a new article of manufacture, an attachment of the class described comprising a dough guard forming disk embodying a pair of substantially duplicate U-shaped companion sections, said sections being disposed together in overlapping relation so that by arranging their arm portions in superposed relation they cooperate in defining a central opening for passage of the shaft of the mixing device, a retaining clip carried by the central portion of one section, a pair of complemental retaining clips carried by the arm portions of the remaining section, said clips being associated to engage over a supporting flange on the mixing device, a pivoted latch carried by one section and a complemental keeper carried by the remaining section.

3. In a dough mixing machine having an agitating shaft with an integral flange, a guard comprising duplicate pivotally connected sections, the respective ends of said sections overlapping to define a central opening for passage of the agitating shaft, a plurality of circumferentially spaced equi-distant clips carried by the central portion of said sections and adapted to cooperate with the inner periphery of said sections to clamp the guard in position on the flange, and means for detachably joining the free ends of the sections.

HENRY BAEHR.